(12) United States Patent
Gerrie et al.

(10) Patent No.: US 7,210,492 B2
(45) Date of Patent: May 1, 2007

(54) RETRACTABLE RAIN COVER FOR A GOLF CART

(76) Inventors: William Gerrie, 445 Pheasant Run, Webster, NY (US) 14580; Kenneth M. McAlpin, 444 Pheasant Run, Webster, NY (US) 14580

( * ) Notice: Subject to any disclaimer, the term of this patent is extended or adjusted under 35 U.S.C. 154(b) by 343 days.

(21) Appl. No.: 10/753,240

(22) Filed: Jan. 8, 2004

(65) Prior Publication Data

US 2005/0150533 A1 Jul. 14, 2005

(51) Int. Cl.
*E04H 15/06* (2006.01)
*E04F 10/02* (2006.01)
*E04F 10/06* (2006.01)
*B60J 11/02* (2006.01)
*B60P 7/04* (2006.01)

(52) U.S. Cl. .............. 135/88.07; 135/88.09; 135/88.11; 135/903; 160/56; 160/66; 296/98; 296/100.12

(58) Field of Classification Search ............ 135/88.01, 135/88.05, 88.09, 88.11, 88.12, 88.07, 903; D12/16; 280/DIG. 6, 288.4, DIG. 5; 150/159; 296/98, 100.12; 160/56, 24, 352, 23.1, 66, 160/273.1, 290.1
See application file for complete search history.

(56) References Cited

U.S. PATENT DOCUMENTS

| 473,292 | A | * | 4/1892 | Campbell | ............ | 296/98 |
| 773,618 | A | * | 11/1904 | Adams | ............ | 160/56 |
| 1,199,766 | A | * | 10/1916 | Dewstow | ............ | 296/98 |
| 2,520,625 | A | * | 8/1950 | Dean | ............ | 160/66 |
| 3,146,824 | A | * | 9/1964 | Veilleux | ............ | 296/98 |
| 4,544,195 | A | * | 10/1985 | Gunn | ............ | 135/88.09 |
| 4,830,037 | A | | 5/1989 | Held | | |
| 5,069,481 | A | | 12/1991 | Strange | | |
| 5,123,474 | A | * | 6/1992 | Smith | ............ | 160/273.1 |
| 5,146,967 | A | * | 9/1992 | Chapman | ............ | 150/159 |
| 5,176,194 | A | * | 1/1993 | Chigusa | ............ | 160/273.1 |
| 5,190,340 | A | | 3/1993 | Nuscher | | |
| 5,259,656 | A | * | 11/1993 | Carroll | ............ | 150/159 |
| 5,310,235 | A | | 5/1994 | Seymour | | |
| 5,588,690 | A | | 12/1996 | Showalter | | |
| 5,688,018 | A | | 11/1997 | Simpson | | |

(Continued)

FOREIGN PATENT DOCUMENTS

CH 635393 A5 * 3/1983

*Primary Examiner*—Tamara L. Graysay
(74) *Attorney, Agent, or Firm*—Harter Secrest & Emery LLP; Brian B. Shaw, Esq.; Stephen B. Salai, Esq.

(57) ABSTRACT

A retractable rain cover is attachable to a golf cart has a rigid frame extending aft from the rear roofline of a golf cart and over a golf bag carried at the rear of the cart. A flexible canopy is movable along the frame from a stowed position to a deployed position. In the stowed position the canopy is contained either rolled up in a housing along the rear roofline or is in a lay flat condition disposed within the footprint of the golf cart roof. In the deployed position the canopy extends along the frame and overlies the golf bag at the rear of the cart. Also, the canopy has a closable opening positioned to align with the upper end of the golf bag when the canopy is in a deployed position thereby permitting direct access through the deployed canopy to any golf club in the bag.

13 Claims, 6 Drawing Sheets

U.S. PATENT DOCUMENTS

| | | |
|---|---|---|
| 5,741,041 A | 4/1998 | Sullivan |
| 6,007,134 A | 12/1999 | Weston |
| 6,068,325 A * | 5/2000 | Hughes ................. 280/DIG. 5 |
| 6,216,714 B1 | 4/2001 | Tucker |
| 6,220,647 B1 | 4/2001 | Winkler |
| 6,227,217 B1 * | 5/2001 | Peta ...................... 135/88.07 |
| 6,227,603 B1 * | 5/2001 | Brock ................... 296/100.14 |
| 6,416,109 B1 | 7/2002 | Tyrer et al. |
| 6,471,281 B1 | 10/2002 | Tyrer et al. |
| 6,474,719 B2 * | 11/2002 | Henning ...................... 296/98 |
| 6,481,780 B2 * | 11/2002 | Dolan et al. ........... 280/DIG. 5 |
| D469,734 S | 2/2003 | Tyrer |
| 6,547,312 B2 | 4/2003 | Winkler |
| D478,859 S | 8/2003 | Tyrer |
| 6,725,807 B1 * | 4/2004 | Tapia ...................... 135/88.01 |
| 2002/0017803 A1 | 2/2002 | Dolan et al. |
| 2002/0027373 A1 | 3/2002 | Winkler |
| 2002/0041106 A1 | 4/2002 | Winkler |
| 2002/0096908 A1 | 7/2002 | Tyrer et al. |
| 2002/0129846 A1 | 9/2002 | True et al. |
| 2002/0145302 A1 | 10/2002 | Winkler |
| 2002/0167192 A1 | 11/2002 | Tyrer et al. |

* cited by examiner

RETRACTABLE RAIN COVER FOR A GOLF CART

CROSS-REFERENCE TO RELATED APPLICATIONS

NONE

STATEMENT REGARDING FEDERALLY SPONSORED RESEARCH OR DEVELOPMENT

Not Applicable

REFERENCE TO A "SEQUENCE LISTING"

Not applicable.

BACKGROUND OF THE INVENTION

1. Field of the Invention

The present invention relates generally to a protective canopy for attachment to a golf cart to protect the clubs in golf bags carried at the rear of a golf cart. More particularly, the present invention relates to such a canopy that is easily deployed in inclement weather and in the deployed position, allows easy access through the canopy to individual clubs in the golf bag.

2. Description of Related Art

It is not uncommon for golfers to use a golf cart while playing a round of golf. In fact, many golf courses require that the players use a golf cart in order to speed play. In a typical arrangement, the golf cart has seating to accommodate two players (a driver and a rider) a rear rack to carry two golf bags side-by-side.

A golf cart generally has a rigid or fabric roof to protect the riders from both sun and rain. In the event of inclement weather, provision is made to protect the golf bags and particularly the golf clubs retained in the bag. For example, protective curtains at the rear of the cart can be unfurled from the sides of the golf cart. The ends of the curtains are brought together and closed over the golf bags to protect the clubs and the bags. In many cases a zipper or snaps that hold the curtains closed can be undone to permit access the clubs if play continues during rain.

Other protective systems include an awning arrangement wherein a canopy attached along the rear roofline of the golf cart can pivot down and over the heads of the golf clubs in the two golf bags. The canopy is raised to allow simultaneous access to the clubs in both bags.

While these protective systems accomplish the intended purpose of protecting the heads of the golf clubs in the bags, they suffer from several drawbacks. For example, some systems are clumsy and difficult to deploy. In others, access to the clubs is gained only by reversing the steps followed in deploying the covering. Another drawback is that once the protective canopy is deployed, access to the clubs in either of the bags carried at the rear of the cart requires that both golf bags be exposed to the elements.

Accordingly, it is an object of the present invention to provide a rain cover attachable to a golf cart wherein the rain cover is easily deployed in inclement weather.

Another object of the present invention is to provide a rain cover that is retracted as easily as it is deployed.

A further object of the present invention is to provide a retractable rain cover that allows separate access to adjacent golf bags covered by a deployed rain cover.

BRIEF SUMMARY OF THE INVENTION

In accordance with the present invention a retractable rain cover is provided that includes a generally open framework that is attachable to a golf cart. The frame is attachable to the roof support columns of the golf cart or to the roof itself or to both. The frame is fixed and has an aft end portion that extends rearward from the rear roofline of the cart and is sized to encompass at least the upper end portions of golf bags carried on a rear platform of the golf cart. In this respect the frame has structural elements that overlie a golf bag carried on the cart and extend below at least an upper portion of the bag. Preferably these structural elements of the aft end portion include a guide track for purposes set out hereinbelow.

The open framework supports a flexible canopy that is movable relative to the frame between a stowed position and a deployed position. The canopy normally is in its stowed position such that it is reefed or retracted relative to the aft end portion of the frame. When the canopy is stowed, open framework exposes the golf bags to the elements. In a stowed position the canopy may be rolled up on a reel that extends along the rear roofline of the cart. As an alternative, the stowed canopy can be in a stretched flat condition that lies within the footprint of the golf cart roof.

When rain protection is needed the canopy is deployed by unfurling it from the reel or extending it out from under the footprint of the cart roof. In its extended position, the canopy is coextensive with the portion of the frame that encompasses at least the top portions of the bags so it overlies the bags to provide a shelter for the golf clubs.

The canopy has two closable openings. When the canopy is deployed and overlies the golf bags at the rear of the golf cart, the two openings will align with the tops of the bags. Flaps secured by a hook and loop fastener, snap or other suitable fastener close the openings. Accordingly, when the canopy is in its extended or deployed position, lifting one or the other of these flaps and reaching through the opening allows access to individual clubs in either of the two bags without exposing the clubs in the adjacent bag.

Accordingly, the present invention may be characterized in one aspect thereof by a retractable rain cover for a golf cart comprising a) a fixed frame attachable to a golf cart, the frame having an aft end portion sized to encompass at least an upper end of a golf bag carried on the cart including a section extending below an upper end of the golf bag; and b) a flexible canopy carried by the frame and movable relative to the frame between a stowed position and a deployed position, the canopy in the deployed position being disposed along the aft end portion and overlying the golf bag.

In another aspect, the present invention may be characterized by a retractable rain cover for a golf cart comprising:

a) ) a fixed frame attachable to a golf cart, the frame having an aft end portion sized to encompass at least an upper end of a golf bag carried on the cart including a section extending below an upper end of the golf bag;

b) a flexible canopy carried by the frame and movable relative to the frame between a stowed position and a deployed position, the canopy in the deployed position being disposed along the aft end portion and overlying the golf bag; and c) the canopy having a closable opening and in the extended position the opening being located over and in alignment with the upper end of the golf bag to permit access to any golf club in the bag when the canopy is in the extended position.

DETAILED DESCRIPTION OF THE INVENTION

Figures 1, 3:
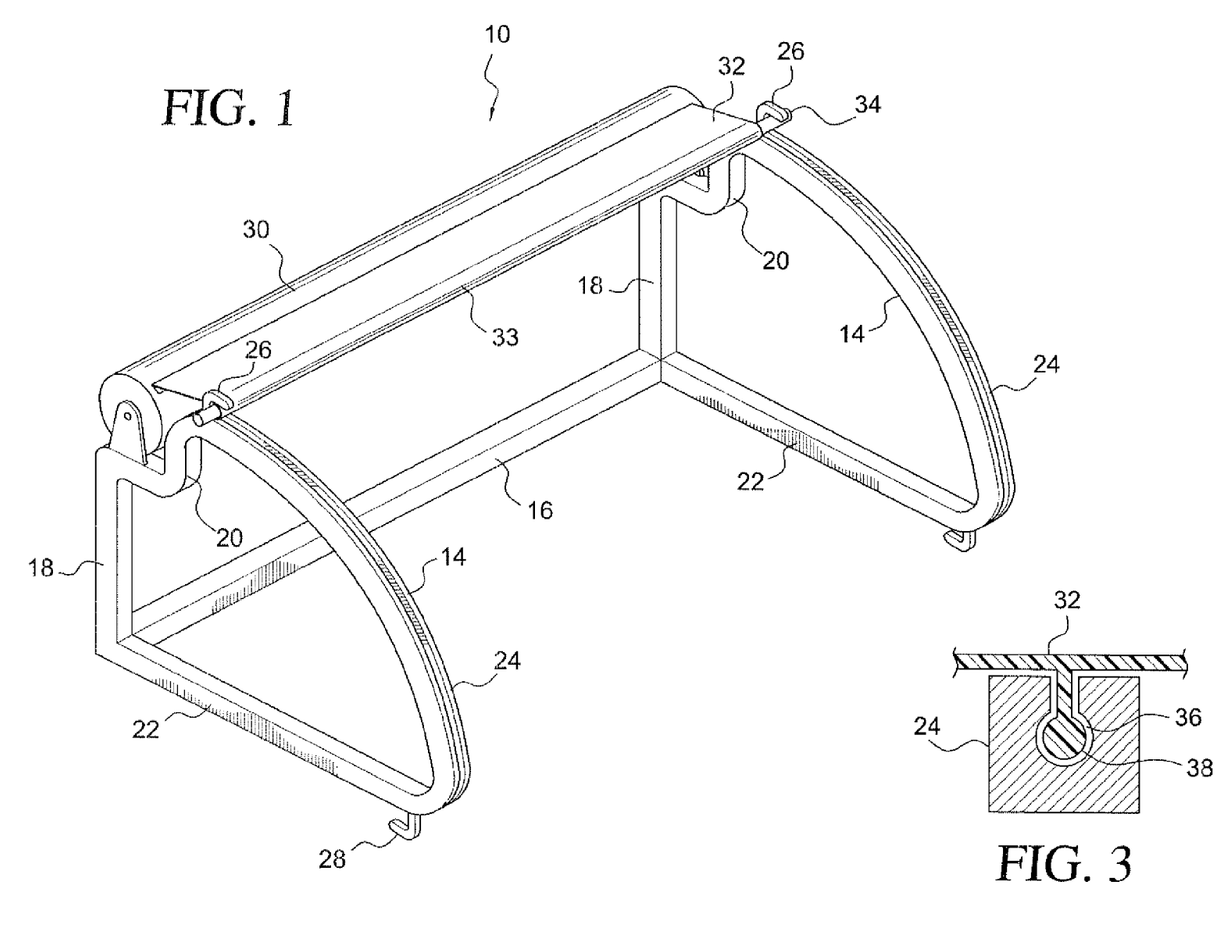
FIG. 1 is a perspective view showing one embodiment of a retractable rain cover assembly of the present invention in a retracted position.
FIG. 3 is a view on an enlarged scale taken along lines 3—3 of FIG. 2.

Referring to the drawings, FIG. 1 shows a first embodiment of a retractable rain cover assembly of the present invention generally indicated at 10. The assembly 10 is attachable to a golf cart as further described hereinbelow and includes an open framework having opposite side members 14 and a connecting crosspiece 16. The cross piece is about as long as a golf cart is wide so that the opposite side members 14 are spaced about a golf cart width apart.

The open framework is formed by rigid structural elements wherein each of the side members 14 includes an upright piece 18, a horizontal piece 22 extending out (rearward or in an aft direction) from the bottom of the upright piece and a curved piece 24 that connects the outer end of the horizontal piece to the top of the upright piece at a dogleg 20.

Each curved piece 24 has a rear facing catch 26 near where the curved piece 24 connects to the dogleg 20. A similar, but opposite (forward) facing catch 28 is located preferably on the horizontal piece 22 near where the horizontal and curved pieces 22, 24 connect.

Extending between the side members 14 is a generally cylindrical housing 30. The housing is connected at its ends in the doglegs 20 and contains a rewind reel (not shown). The housing provides storage for a length of a flexible canopy that is wound onto the reel. The canopy, a portion of which is shown at 32, preferably is made of a flexible rain proof or rain repellant material such as canvas, plastic or the like. Preferably the rewind reel in the housing 30 is spring loaded so that when the canopy material is pulled out from the housing, a rewind force is created that tends to retract the canopy into the housing.

The trailing edge (not shown) of the canopy material is fixed within the housing 30 to the rewind reel and the leading edge 33 of the canopy material is attached to a rod 34. The engagement of this rod with the rear facing catch 26 as shown in FIG. 1 prevents the canopy material from being retracted entirely into the housing. This holds the leading edge of the canopy in an accessible position.

Figures 2, 2A:
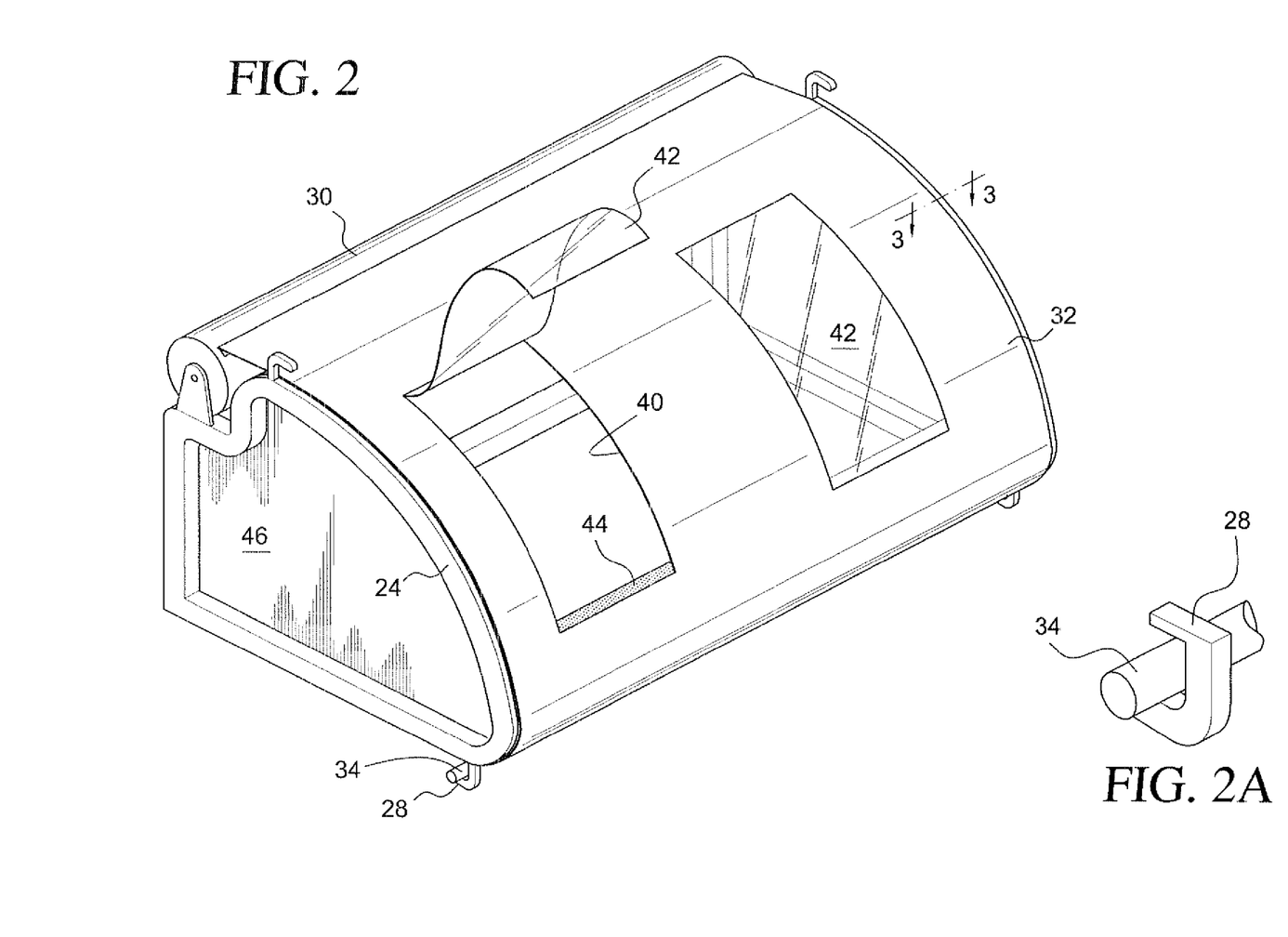
FIG. 2 is a view similar to FIG. 1 only showing the assembly in a deployed position and FIG. 2A is a view showing a portion of FIG. 2 on an enlarged scale.

FIG. 2 shows the flexible canopy material 32 in a deployed position. In this respect the canopy material is shown fully extended from the housing 30 with the rod 34 at the forward end of the material being engaged with the forward facing catch 28 (FIG. 2A). In its deployed position the canopy material is shaped by the curved pieces 24. This is due, in part, to the rewind force of the reel within the housing that pulls the canopy material between the housing and the catch 28 taut against the curved piece 24. Accordingly, the canopy material 32, as shown in FIG. 2 conforms to the profile of the opposite side members 14 and is maintained taught by the curved pieces 24.

In addition, or as an alternative method of having the canopy material conform to the shape of the side members, FIG. 3 shows that each of the curved pieces 24 may include a guide channel 36 formed in a curved face of the piece. Disposed in the channel is a bead 38 formed along the lateral edges of the canopy material. With the bead captured in the channel, the canopy material will be drawn along the surface of the curved piece as the material is extended or retracted relative to the housing 30. The engagement of the bead and channel further serves to secure the canopy material to the curved piece. Securing the canopy material to the curved pieces prevents a wind force from lifting the canopy of off the curved pieces.

Referring again to FIG. 2, canopy material 32 is provided with two openings 40. The openings are strategically located (as discussed further hereinbelow) and are closed by a flap 42. Preferably the flap is made of a clear material and is held in a closed position by any suitable quick release fastener 44 such as a snap, zipper or a loop and hook fastener. FIG. 2 further shows that each side member 14 has an attached panel 46 that closes off the sides of the frame. The panel may be held to the side members 14 by any suitable fastener that allows easy removal. The attached panel may be of the same flexible material as the canopy material or of a more rigid character.

Figure 4:
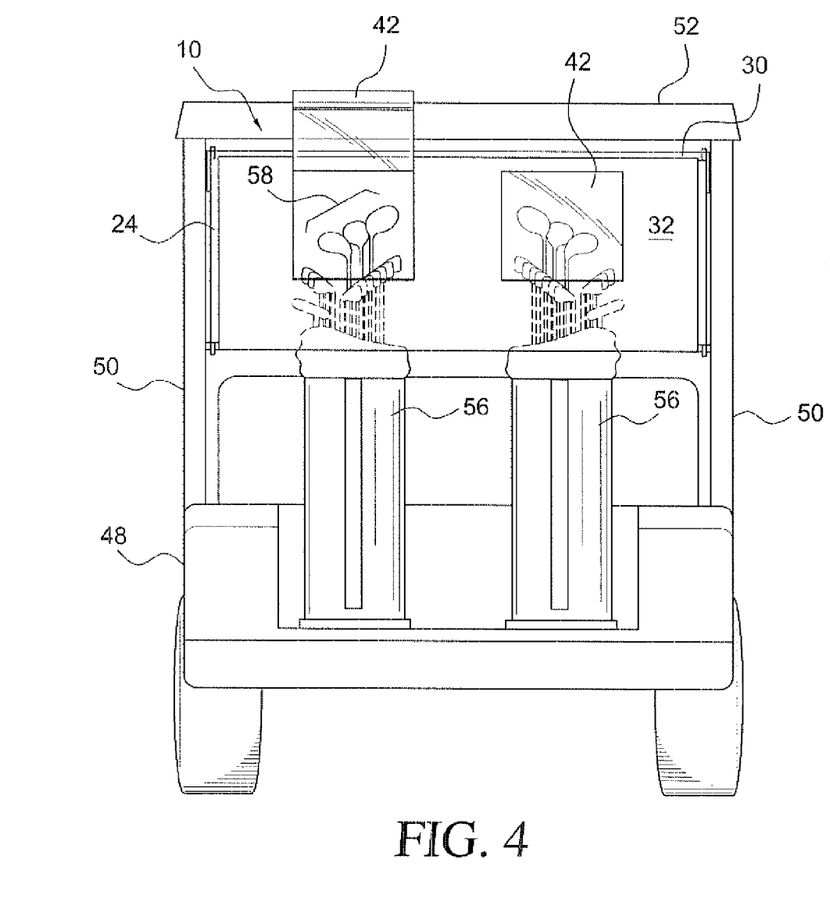
FIG. 4 is a rear elevation view showing the assembly of FIG. 2 attached to a golf cart.
Figure 5:
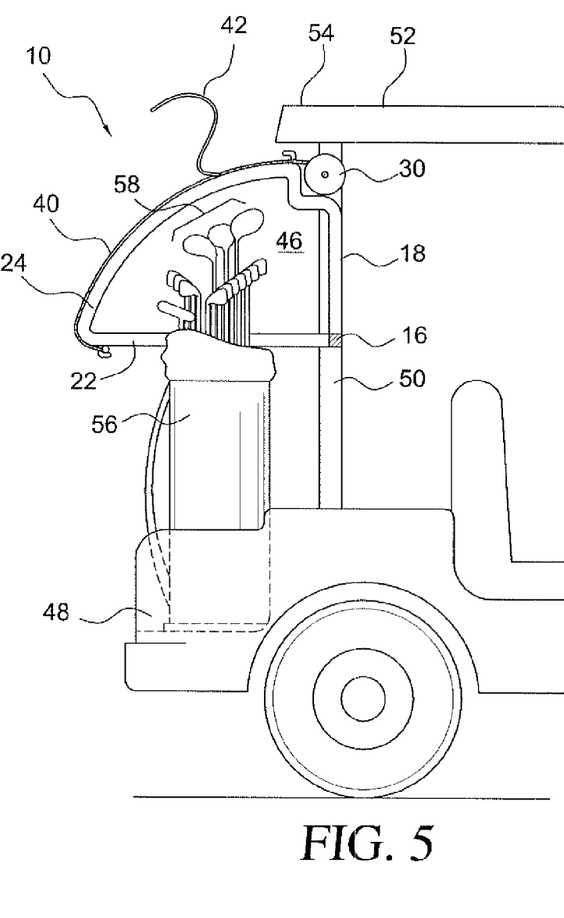
FIG. 5 is a side elevation view showing a portion of the golf cart of FIG. 4.

FIGS. 4 and 5 show the retractable rain cover assembly 10 attached to a golf cart 48 and the canopy material in a deployed or extended position to overlie a pair of golf bags 56 carried at the rear of the cart. In this respect the frame upright pieces 18 preferably are attached to support columns 50 that hold up the roof 52 of the golf cart. With this arrangement, the housing 30 extends along the rear roofline 54 of the cart.

The horizontal pieces 22 extend in an aft direction from the golf cart (FIG. 5) and are long enough to extend beyond the golf bags 56. Moreover the horizontal pieces are positioned at an elevation that is well below the upper ends of the golf bags so the curved pieces 24 arch over the golf bags. Thus, as shown in FIGS. 4 and 5, the height, depth and length of the frame as defined by the side members 14 and the length of the cross piece 16 are such that the frame accommodates an upper end of the golf bag 56 carried on the cart.

Since the curved pieces 24 arch over the bags, the heads 58 of the clubs extending from the bag are encompassed by a combination of the deployed canopy material 32 that overlies the club heads and by the side panels 46 that close off the open sides of the frame. In this fashion the club heads are protected from rain.

FIGS. 4 and 5 also show that when the canopy material is deployed, the openings 40 in the canopy are located above each of the golf bags 56. Accordingly, if play continues during a rain shower, individual clubs in either of the bags can be accessed and removed through the openings simply by raising the respective flap 42. Moreover, accessing the clubs in one bag will not expose the clubs in the other.

The canopy material may be deployed as needed and in fair weather, it is simply retracted to a stowed position in the housing 30 as shown in FIG. 1. To stow the canopy material, the rod 34 is released from the catch 28. The canopy material then is moved manually or preferably by a rewind tension back onto the reel within the housing. As the leading edge of the canopy material approaches the housing, the rod 34 is engaged with the catch 26 (FIG. 1).

Figures 6, 6A, 8:
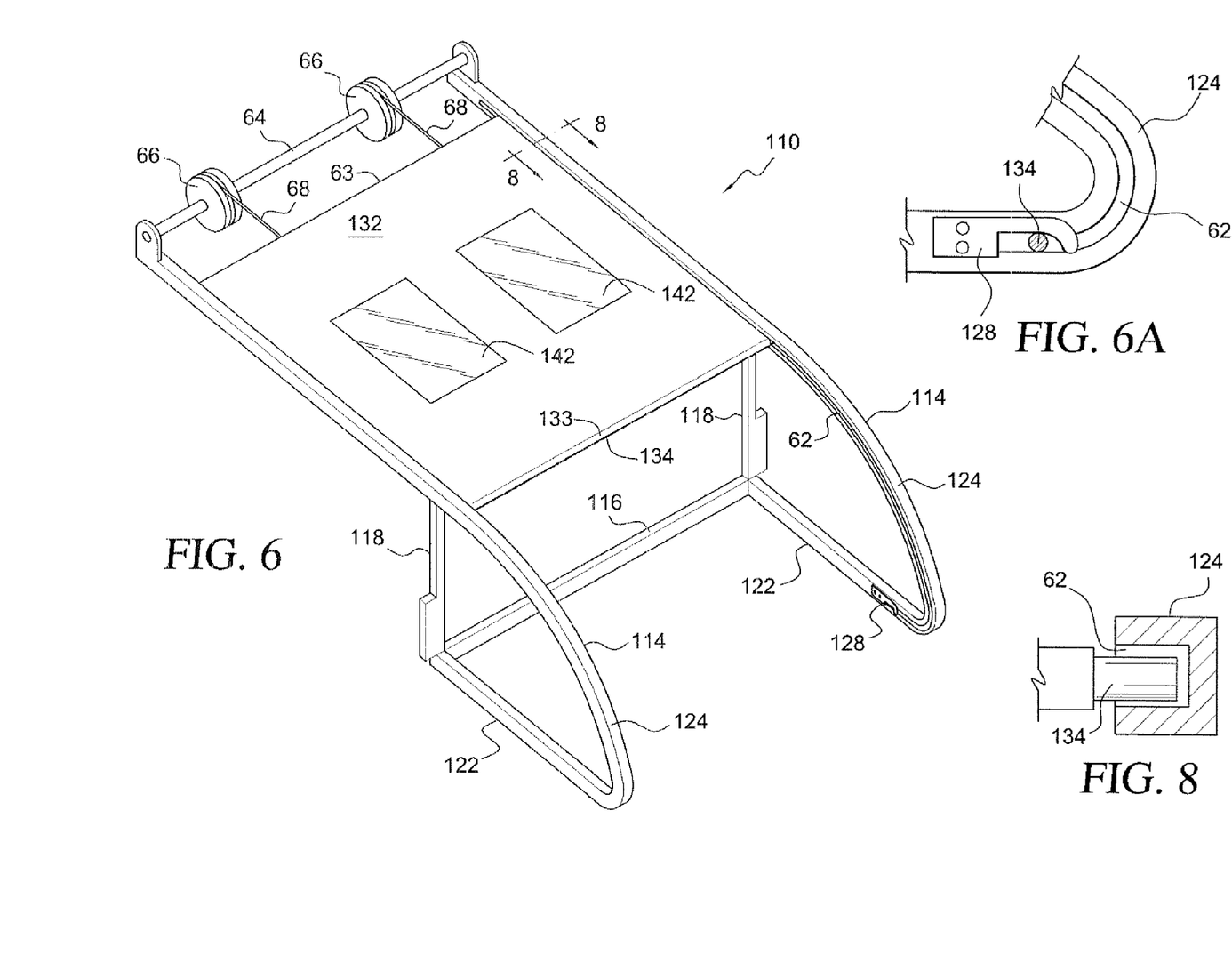
FIGS. 6 and 7 are views similar to FIGS. 1 and 2 respectively only showing another embodiment of a retractable rain cover according to the present invention and FIG. 6A is a view showing a portion of FIG. 6 on an enlarged scale.
FIG. 8 is a view on an enlarged scale taken along lines 8—8 of FIG. 6.
Figure 7:
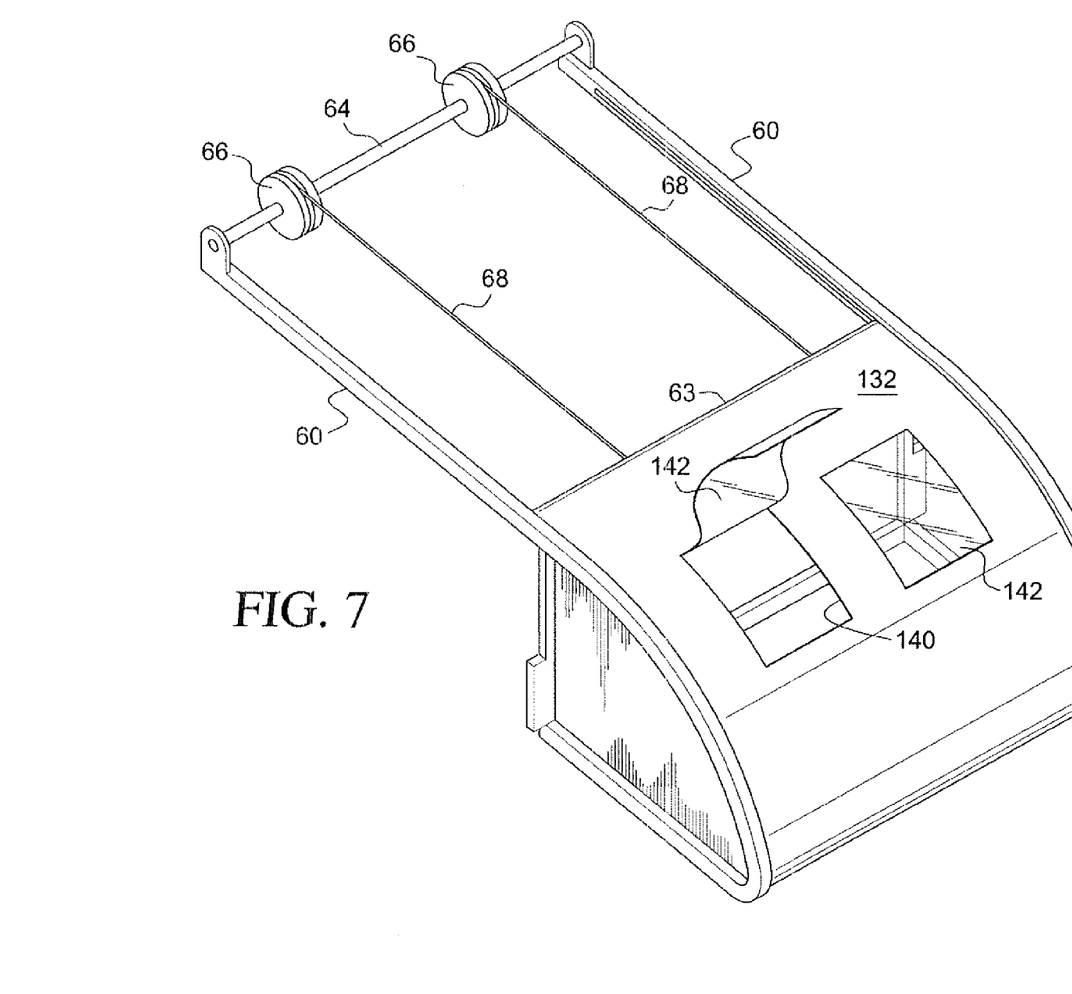

FIGS. 6 and 7 illustrate another embodiment of the invention. In this embodiment, rather than storage on a reel within a housing 30 at the golf cart rear roofline as shown in FIG. 1, the canopy material 132 instead is stored flat and within the footprint of the golf cart roof. Accordingly, as shown in FIG. 6, the retractable rain cover assembly 110 comprises an open framework of generally the same size and shape as the open framework of the FIG. 1 embodiment and includes opposite side members 114 connected by a cross piece 116.

The rigid structural elements forming each side member 114 include an upright piece 118, a horizontal piece 122 and a curved piece 124. In this case however, the dogleg connection of the upright piece 118 to the curved piece is missing. Instead there are two rails 60 that attach to or comprise a continuation of each curved piece 124 and extend in a forward direction. Each rail 60 has a channel 62 that continues into the curved piece 124.

At the forward most end of each rail is an axle 64. The axle is journaled at its ends to each of the rails. Fixed to the axle is a pair of spaced pulleys 66. A cord 68 is wound on each pulley, the free end of each cord being attached to a trailing edge 63 of the canopy material 132. Preferably the rotation of the axle 64 (or of the pulleys 66) is biased so there is a rewind force on the chords.

The canopy material 132 lies between the rails and its leading edge 133 is attached to a rod 134. As shown in FIG. 8, the opposite ends of the rod 134 ride in the channels 62. Accordingly and as noted above, the canopy when stowed is flat (rather than rolled) and it lies within the footprint of the roof and substantially parallel to the plane of the roof.

To deploy the canopy material, one simply pulls the rod 134 so the flat canopy moves along the channel 62 out from under the golf cart roof and follows the curved pieces 124 to the position shown in FIG. 7. As the canopy material is deployed, the rewind force on the chords 68 increase so the rod 134 must be latched to hold the canopy in a deployed position.

As shown in FIG. 6, a catch 128 is provided at the lower end of each curved piece 124 adjacent the end of the channel 62. When the canopy material is in a deployed position, the ends of the rod 134 are engaged with the catch as shown in FIG. 6A to hold the canopy material against the rewind bias.

Figure 9:
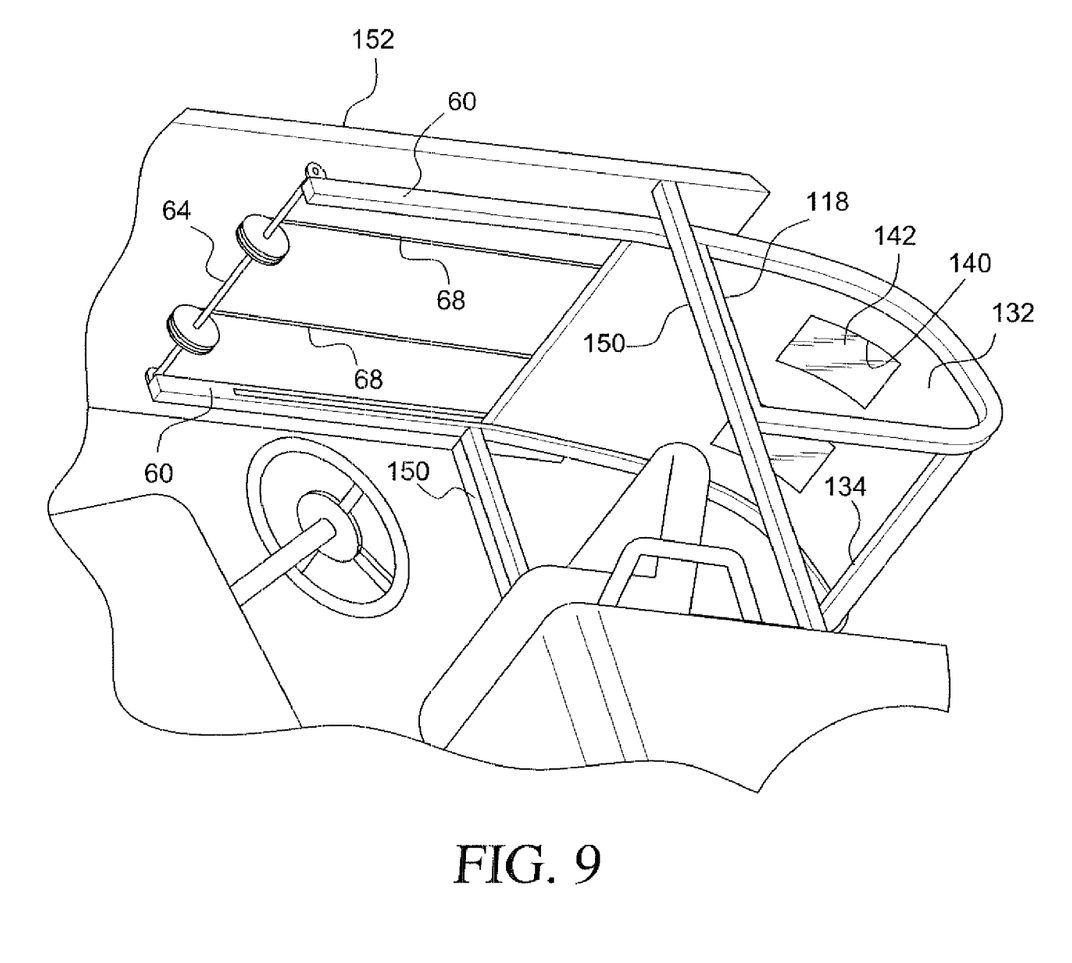
FIG. 9 is a bottom perspective view showing the assembly of FIGS. 6 and 7 attached to a golf cart.

FIG. 9 shows the rain cover assembly of FIGS. 6 and 7 attached to a golf cart with the canopy material deployed. In this respect the side rails 60 are attached to the underside of the golf cart roof 152 and the frame upright pieces 118 are attached to the roof support columns 150. The open framework as defined by the side members 114 and the cross piece 116, like the framework of the FIG. 1 embodiment, is of a size and shape to encompass an upper portion of a golf bag (not shown) carried on the cart. Accordingly, when the canopy material is deployed as shown in FIGS. 7 and 9, the heads of clubs contained in the bag are protected from the rain. Further the appropriate openings 140 and closing flaps 142 are provided to permit access to the clubs when the canopy material is deployed.

To retract the canopy material to a stowed position, the rod 134 is unlatched from the catch 128 to allow a spring bias to rewind the pulleys 66 and reel up the chords 68. This returns the canopy material to its stowed position within the footprint of the golf cart roof.

Accordingly, it should be appreciated that the present invention accomplishes its intended objects in providing a retractable rain cover attachable to the roof of a golf cart wherein the rain cover is easily deployed in inclement weather and is retracted as easily as it is deployed. When in the deployed position, the rain cover allows separate access to adjacent golf bags so the clubs in one bag need not be exposed to the rain when selecting a club from another bag.

The invention claimed is:

1. A retractable rain cover for attachment to a golf cart, the golf cart having a roof and a rear end portion adapted to support at least two side-by-side upright golf bags, the rain cover being attachable to the golf cart roof and comprising:
    a) a rigid open frame attachable to the golf cart roof so as to extend rearward from a rear roof line of the golf cart, the frame including
        i) two upright pieces spaced a sufficient distance apart to accommodate two side-by-side upright golf bags therebetween.
        ii) a horizontal piece extending in an aft direction from a lower end of each upright piece and
        iii) a curved piece extending from an upper end of each upright piece to the outward end of each horizontal piece, the height, depth and length of the frame being sufficient to encompass the upper ends of two side-by-side upright golf bags;
    b) a flexible canopy carried by the frame and movable relative to and along the frame between a stowed position and a deployed position, the canopy in the deployed position extending along and being supported by the curved pieces and the canopy in the deployed position being adapted to protectively overly the upper ends of two side-by-side upright golf bags;
    c) the canopy having a pair of closable openings, each of the openings being so located that the openings are adapted to align with the upper ends of the golf bags when the canopy is in the deployed position thereby providing access to a golf club without the need to stow the canopy;
    d) bias means associated with the frame urging the canopy to a stowed position; and
    e) a catch on the frame adjacent the juncture of each horizontal piece and curved piece engageable with the canopy to hold the canopy in the deployed position against the bias.

2. A retractable rain cover as in claim 1 wherein the frame includes a housing and the canopy in the stowed position being at least partly disposed in a roll in the housing.

3. A retractable rain cover as in claim 2 wherein the canopy in the deployed position is biased toward the stowed position within the housing.

4. A retractable rain cover as in claim 3 wherein the catch on the frame cooperates with a rod attached to a leading edge of the canopy, the catch and rod engageable when the canopy is at the deployed position to prevent movement of the canopy toward the stowed position.

5. A retractable rain cover as in claim 2 wherein:
    a) the curved piece and the upright piece connect at a dog leg;

b) the housing is cylindrical and is supported at its ends in the doglegs and adapted to extend along a rear roof line of the golf cart; and c) the canopy in its stowed position is at least partly within the housing and the canopy moves from the housing and relative to the frame to a deployed position that reaches the outward extending end of the horizontal piece.

6. A retractable rain cover as in claim 1 wherein the curved piece includes a channel and the canopy includes a bead disposed in the channel.

7. A retractable rain cover as in claim 1 wherein the canopy in the stowed position adapted to lie within the footprint of the golf cart roof.

8. A retractable rain cover as in claim 1 including a pair of spaced rails extending in a forward direction from the frame and adapted for positioning below the golf cart roof with the canopy disposed between the rails.

9. A retractable rain cover as in claim 8 wherein each rail has a channel and the canopy has side edges guided by the channel during movement between the stowed and deployed positions.

10. A retractable rain cover as in claim 8 wherein the bias means urging the canopy towards the stowed position comprises:

a) a rewind reel attached to at least one of the rails; and b) a chord wound on the reel, the chord having a free end attached to a trailing edge of the canopy material.

11. A retractable rain cover as in claim 8 wherein the pair of spaced rails are each attachable to the underside of a golf cart roof and the canopy has opposite side edges disposed in a channel extending along each rail.

12. A retractable rain cover as in claim 11 including a rewind reel on at least one of the rails and a chord extending from the reel to a trailing edge of the canopy.

13. A retractable rain cover as in claim 1 wherein the frame includes spaced rails adapted to extend beneath the roof on the golf cart and attach to lateral side edges of the canopy and the canopy, in its stowed position, is substantially flat between the rails and is adapted to be disposed within the footprint of the golf cart roof.

* * * * *